United States Patent [19]

Pierson

[11] Patent Number: 4,865,680
[45] Date of Patent: Sep. 12, 1989

[54] ULTRASONIC SECURING SYSTEM

[75] Inventor: Charles W. Pierson, Rochester, N.Y.

[73] Assignee: Eastman Kodak Company, Rochester, N.Y.

[21] Appl. No.: 288,936

[22] Filed: Dec. 23, 1988

[51] Int. Cl.$^4$ ............................................. B29C 65/08
[52] U.S. Cl. ............................ 156/580.2; 156/73.1; 156/497; 156/569; 228/1.1; 228/110; 264/23; 425/174.2
[58] Field of Search ............ 156/73.1, 497, 469, 156/580.1, 580.2; 264/23; 228/1.1, 110; 425/174.2

[56] References Cited

U.S. PATENT DOCUMENTS

| | | | |
|---|---|---|---|
| 3,233,012 | 2/1966 | Bodine, Jr. | 264/23 |
| 3,367,809 | 2/1968 | Soloff | 156/73.1 |
| 3,464,102 | 9/1969 | Soloff | 156/73.1 |
| 3,483,611 | 12/1969 | Balamuth et al. | 29/509 |
| 3,499,808 | 3/1970 | Obeda | 156/73.1 |
| 4,106,962 | 8/1978 | Adams et al. | 156/73.1 |
| 4,312,077 | 1/1982 | Petersson | 2/265 |

FOREIGN PATENT DOCUMENTS 318443  10/1971  U.S.S.R. ................... 156/73.1

Primary Examiner—Michael Wityshyn
Attorney, Agent, or Firm—William C. Dixon

[57] ABSTRACT

A system for securing first and second parts together via a spheroid, wherein the first part has an aperture slightly smaller than the spheroid while the second part and spheroid each include ultrasonically fusible material. The system comprises means for supporting the two parts in superposed relation so that the aperture in the first part overlies a portion of the second part, means containing the spheroid among a plurality thereof, and means including a concentrating horn for applying ultrasonic energy to the spheroid, the horn having a tip provided with a hemispherical depression connected to a source of vacuum for receiving and releasably retaining the spheroid. The system also comprises means for moving the horn from the containing means, where the tip receives and retains the spheroid, to the parts-supporting means, where the tip deposits and releases the spheroid in the aperture so that a portion of the spheroid extends therethrough into contact with the underlying portion of the second part. The system further comprises means for activating the horn to ultrasonically vibrate its tip against the spheroid and thus impart ultrasonic energy to both the spheroid and the underlying second part, thereby heat-softening the spheroid and second part and causing the spheroid material to flow through the aperture, fuse with the second part material, and overlap an adjacent portion of the first part, whereby the two parts, via the spheroid, are firmly secured together.

6 Claims, 2 Drawing Sheets

ULTRASONIC SECURING SYSTEM

BACKGROUND OF THE INVENTION

1. Field of the Invention

The present invention relates generally to a system for securing component parts together, and particularly to such a system that is especially useful for securing parts made of dissimilar materials.

2. Description of the Prior Art

The prior art is replete with disclosures of various methods and apparatus for securing component parts together, including parts made of dissimilar materials. For example, U.S. Pat. No. 3,367,809 to Soloff discloses a method for ultrasonically staking thermoplastic parts to other parts. For another example, U.S. Pat. No. 3,483,611 to Balamuth et al. discloses methods and apparatus for ultrasonically staking and riveting component parts together. Also, U.S. Pat. No. 4,106,962 to Adams et al. discloses a method for ultrasonically securing metallic and thermoplastic parts together, wherein ultrasonic energy is applied to an apertured depression in the metallic part while the depression is pressed against the thermoplastic part, causing an adjacent portion of the thermoplastic part to soften, flow through the aperture, fill the depression therearound, and thereby lock the two parts together upon cooling.

FIG. 1 of the drawings herein illustrates a process, known in the prior art as conventional ultrasonic staking, which fuses parts together by using heat generated from contact together with mechanical pressure and high-frequency sound waves. To use ultrasonic staking effectively, it is necessary that one of the parts, such as substrate 1, be made of a material that responds to ultrasonic heating. The stake 2 is a raised feature on substrate 1. Hole 3 is provided in mating part 4 to fit over stake 2. After mating part 4 is properly aligned with substrate 1, stake 2 is heated by means of an ultrasonic horn 5. As stake 2 melts, pressure is maintained thereon. That presses the stake down, so that it becomes larger than hole 3. Horn 5 is then removed, leaving the two parts 1 and 4 held together in a manner that is similar to conventional riveting.

There are two disadvantages in using ultrasonic staking in an automated process: (1) ultrasonic-horn-to-stake alignment is critical, in that any misalignment adversely affects the integrity of the bond; and (2) any design changes require either retrofitting the old parts or fabricating new ones.

Conventional riveting is an alternative method for fastening parts together. This method also has disadvantages when used in an automated process. Holes are necessary in both parts being joined. A rivet must be placed in those holes and forced down, holding the parts together mechanically. Properly aligning the holes and properly orienting the rivet make conventional riveting difficult to automate.

SUMMARY OF THE INVENTION

Even though conventional ultrasonic staking and conventional riveting are not ideally suited for use in an automated assembly process, they do offer some advantages. The advantages of both of those methods are achieved by the new system of this invention using an ultrasonic spherical rivet, or spheroid, to secure component parts together. Like conventional ultrasonic staking, the spheroid needs a hole only in the mating part. Unlike conventional ultrasonic staking, the underlying part, or substrate, is featureless. Like conventional riveting, the shperoid is a separate piece that is used to hold the two joined parts together. Unlike conventional riveting, orientation of the spheroid is not necessary. Ultrasonic spherical rivets, or spheroids, as provided by this invention are thus well suited for automated processes because: (1) their shape eliminates the orientation requirement; (2) ultrasonic horn alignment is less critical; and (3) only one hole need be aligned.

The present invention finds utility in a system for securing a first part to a second part via a spheroid, the first part having an aperture therein slightly smaller than the spheroid, the second part and the spheroid each including ultrasonically fusible material. This system comprises means for supporting the first and second parts in superposed relation, so that the aperture in the first part overlies a portion of the second part; means for containing the spheroid among a plurality thereof; and means, including a movable and activatable concentrating horn, for applying ultrasonic energy to the spheroid, the horn having a tip thereon provided with means for receiving and releasably retaining the spheroid. The system also comprises means for moving the horn from a first site adjacent to the containing means, where the tip is disposed to receive and releasably retain the spheroid, to a second site adjacent to the supporting means, where the tip is disposed to deposit and release the spheroid in the aperture so that a portion of the spheroid extends therethrough into contact with the underlying portion of the second part. The system further comprises means for activating the horn to ultrasonically vibrate its tip against the spheroid, and thereby impart ultrasonic energy to both the spheroid and the underlying portion of the second part, so as to heat-soften the spheroid and the underlying portion of the second part and thus cause the spheroid fusible material to flow through the aperture and fuse with the second part fusible material, whereby the first part, via the spheroid, is secured to the second part.

This invention, and its objects and advantages, will become more apparent in the detailed description of the illustrated embodiment thereof presented hereinbelow.

BRIEF DESCRIPTION OF THE DRAWINGS

In the detailed description of the embodiment of this invention presented below, reference is made to the accompanying drawings, wherein like reference characters denote like elements, and wherein.

DESCRIPTION OF THE ILLUSTRATED EMBODIMENT

Because certain parts of ultrasonic fastening systems are well known, the following description is directed in particular to those elements forming, cooperating directly with, or relating to, this invention. Elements not specifically shown or described herein are selectable from those known in the relevant art.

Figure 1:
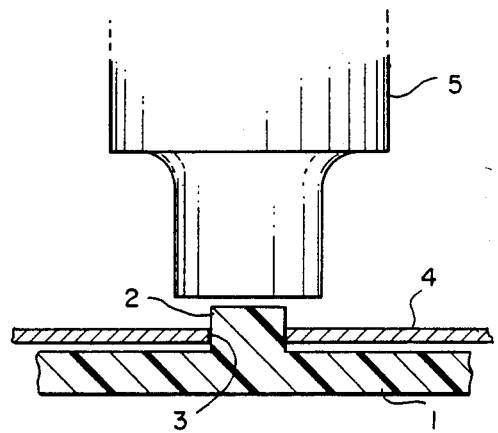
FIG. 1 is an elevational view, partly in section, illustrating conventional ultrasonic staking as known in the prior art.
Figure 2:
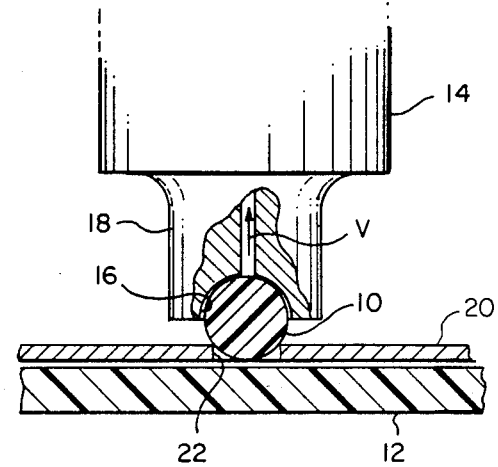
FIG. 2 is an elevational view, partly in section similar to FIG. 1, but illustrating an embodiment of the ultrasonic spherical riveting system of this invention.
Figure 4:
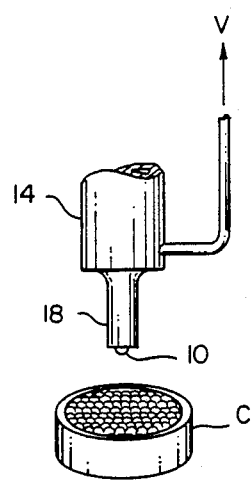
FIGS. 4 and 5 depict stages in the illustrated embodiment preceding that shown in FIG. 2.
Figure 5:
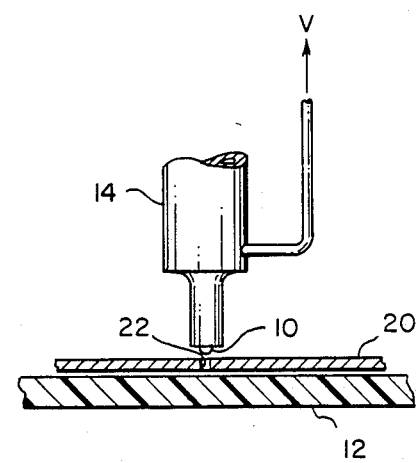

Shown in FIG. 2 is an ultrasonic spherical rivet, or spheroid, 10 made of an ultrasonically fusible thermoplastic material for bonding to an ultrasonically fusible thermoplastic substrate 12. An ultrasonic horn 14 has a hemispherical depression 16 in its tip 18 that is formed to fit over the spheroid 10. Vacuum V is applied to depression 16 to pick up and releasably retain spheroid 10 from a supply of spheroids held in a container C (shown in FIG. 4). Horn 14, which could be mounted on the end of a robot arm A (shown in FIG. 6), is then positioned over the part 20 that is to be joined to substrate 12 (as shown in FIG. 5). A circular hole or aperture 22, slightly smaller than the spheroid, is provided in part 20. Horn 14 is then lowered to deposit spheroid 10 in hole 22 so that a lower portion of the spheroid extends through the hole and into contact with the underlying portion of the substrate.

Figure 3:
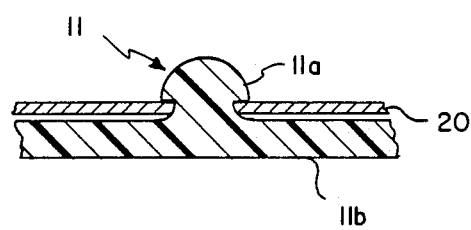
FIG. 3 is a cross-sectional elevation illustrating the parts shown in FIG. 2 after they have been joined together.

While pressure is maintained by tip 18 bearing down upon spheroid 10, vacuum V is turned off and horn 14 is activated. The portion of spheroid 10 that is in contact with substrate 12 then begins to melt. Ultrasonic energy also is transferred to substrate 12, and it too begins to melt. The melting action fuses the spheroid to the substrate. Horn 14 is then deactivated. When the joined parts have cooled sufficiently, horn 14 is retracted, leaving part 20 firmly secured to substrate 12 by the combination 11 comprising fused spheroid portion 11a and fused substrate portion 11b (as shown in FIG. 3). It will be noted that the fused spheroid portion 11a has completely filled hole 22 and overlaps and adjacent surrounding portion of part 20, thus positively locking the joined parts together.

Figure 6:
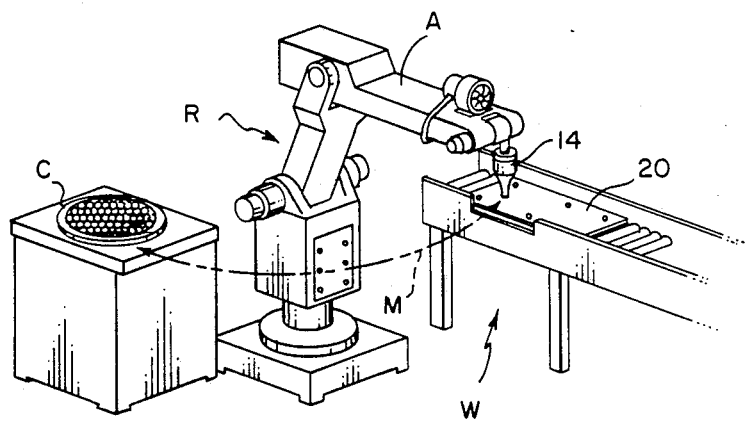
FIG. 6 is a pictorial perspective view illustrating an automated embodiment of an ultrasonic spherical riveting system in accordance with the present invention.

FIG. 6 illustrates an automated embodiment of this invention, wherein a robot R, with horn 14 mounted on arm A thereof, moves the horn from container C, along movement path M, to a site immediately above part 20 superposed upon substrate 12 (not shown) at work station W.

The ultrasonic spherical rivet, or spheroid, of this invention offers some very useful advantages over both conventional riveting and ultrasonic staking. Conventional riveting requires holes in both parts to be joined; the spheroid of this invention requires a hole in only one of those parts. This feature thus eliminates any need for hole alignment. Also, conventional rivets mush be oriented correctly before being used; the spheroid's symmetry eliminates that need. Ultrasonic staking requires special preforming or prefabrication of the substrate; the spheroid works with an unfeatured substrate, and design changes do not entail any special treatment of the substrate. Ultrasonic spherical rivets, or spheroids, are thus well suited for use in automated parts-assembly systems.

Although the above-described embodiment of this invention is depicted as using a plastic spheroid fusible with a plastic substrate, the invention also comtemplates use of various metals as the ultrasonically fusible materials for the spheroid and the substrate. It should therefore be understood that, while this invention has been described with particular reference to the embodiment illustrated herein, variations and modifications can nonetheless be effected within the spirit and scope of the invention.

I claim:

1. A system for securing a first part to a second part via a spheroid, the first part having an aperture therein slightly smaller than the spheroid, the second part and the spheroid each including ultrasonically fusible material, said system comprising;

means for supporting said parts in superposed relation, so that said aperture of said first part overlies a portion of said second part;

means for containing said spheroid among a plurality thereof;

means, including a movable and activatable concentrating horn, for applying ultrasonic energy to said spheroid, said horn having a tip thereon with means for receiving and releasably retaining said spheroid;

means for moving said horn from a first site adjacent to said containing means, where said tip is disposed to receive and releasably retain said spheroid, to a second site adjacent to said supporting means, where said tip is disposed to deposit and release said spheroid in said aperture so that a portion of said spheroid extends therethrough into contact with said portion of said second part; and means for activating said horn to ultrasonically vibrate said tip against said spheroid, and thereby impart ultrasonic energy to both said spheroid and said portion of said second part, so as to heat-soften said spheroid and said portion of said second part and thus cause said spheroid fusible material to flow through said aperture and fuse with said second part fusible material;

whereby said first part, via the spheroid, is secured to said second part.

2. A system as claimed in claim 1 wherein said first part aperture is substantially circular.

3. A system as claimed in claim 1 wherein said second part fusible material and said spheroid fusible material are each thermoplastic.

4. A system as claimed in claim 1 wherein said horn tip is configured to be insertable into said containing means to receive said spheroid from among said plurality thereof.

5. A system as claimed in claim 1 wherein said means for receiving and releasably retaining said spheroid includes a substantially hemispherical depression in said tip adapted to receive and partially confine said spheroid, and a passageway in said tip for communicating releasable vacuum to said depression to retain said spheroid until such vacuum is released.

6. A system as claimed in claim 1 wherein said spheroid fusible material, when caused to flow through said aperture and fuse with said second part fusible material, fills said aperture and overlaps an adjacent portion of said first part.

* * * * *